(12) United States Patent
Behera et al.

(10) Patent No.: US 11,243,843 B2
(45) Date of Patent: Feb. 8, 2022

(54) METHOD AND SYSTEM FOR OPTIMIZING BACKUP AND BACKUP DISCOVERY OPERATIONS USING CHANGE BASED METADATA TRACKING (CBMT)

(71) Applicant: EMC IP Holding Company LLC, Hopkinton, MA (US)

(72) Inventors: Amarendra Behera, Bangalore (IN); Tushar B. Dethe, Bangalore (IN); Himanshu Arora, Bangalore (IN); Gururaj Soma, Bangalore (IN); Krishnendu Bagchi, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 275 days.

(21) Appl. No.: 16/673,448

(22) Filed: Nov. 4, 2019

(65) Prior Publication Data
US 2021/0133037 A1    May 6, 2021

(51) Int. Cl.
*G06F 11/10* (2006.01)
*G06F 11/14* (2006.01)

(52) U.S. Cl.
CPC ...... *G06F 11/1451* (2013.01); *G06F 2201/80* (2013.01); *G06F 2201/82* (2013.01)

(58) Field of Classification Search
None
See application file for complete search history.

(56) References Cited

U.S. PATENT DOCUMENTS

| | | | | |
|---|---|---|---|---|
| 10,241,870 B1 * | 3/2019 | Beatty | ........... | G06F 16/903 |
| 2017/0329677 A1 * | 11/2017 | Crofton | ........... | G06F 21/6227 |
| 2020/0034248 A1 * | 1/2020 | Nara | ........... | G06F 11/1464 |
| 2020/0159413 A1 * | 5/2020 | Seal | ........... | G06F 3/0673 |
| 2020/0192899 A1 * | 6/2020 | Joshi | ........... | G06F 16/24539 |

* cited by examiner

*Primary Examiner* — Belix M Ortiz Ditren
(74) *Attorney, Agent, or Firm* — Chamberlain, Hrdlicka, White, Williams & Aughtry

(57) ABSTRACT

A method and system for optimizing backup and backup discovery operations using change based metadata tracking (CBMT). Specifically, the disclosed method and system entail eliminating the storage and subsequent transmission of redundant asset metadata information to a central coordination point during backup discovery operations, which may strain central coordination point resources, as well as client device resources. Accordingly, rather than re-sharing the same asset metadata information every time a backup discovery initiates, the client device tracks, maintains, and transmits only changes in asset metadata, thereby conserving resource utilization.

20 Claims, 5 Drawing Sheets

METHOD AND SYSTEM FOR OPTIMIZING BACKUP AND BACKUP DISCOVERY OPERATIONS USING CHANGE BASED METADATA TRACKING (CBMT)

BACKGROUND

Intelligent asset backup management requires tracking of metadata describing the assets targeted by backup operations, as well as metadata describing the backup operations themselves.

SUMMARY

In general, in one aspect, the invention relates to a method for asset backup optimization. The method includes receiving, from a client device manager, a first backup operation request comprising a service name associated with a service, performing, in response to the first backup operation request, a backup operation targeting a first asset mapped to the service name to obtain backup operation metadata, making a first determination that the backup operation does not represent a first backup operation directed to the service, identifying, based on the first determination, an asset metadata delta between a first current asset metadata and a first previous asset metadata object associated with the service, updating a first backup metadata object associated with the service using the backup operation metadata and the asset metadata delta to obtain a second backup metadata object for the service, and overwriting the first previous asset metadata object using the first current asset metadata to obtain a second previous asset metadata object for the service.

In general, in one aspect, the invention relates to a non-transitory computer readable medium (CRM) that includes computer readable program code, which when executed by a computer processor, enables the computer processor to: receive, from a client device manager, a first backup operation request comprising a service name associated with a service, perform, in response to the first backup operation request, a backup operation targeting a first asset mapped to the service name to obtain backup operation metadata, make a first determination that the backup operation does not represent a first backup operation directed to the service, identify, based on the first determination, an asset metadata delta between a first current asset metadata and a first previous asset metadata object associated with the service, update a first backup metadata object associated with the service using the backup operation metadata and the asset metadata delta to obtain a second backup metadata object for the service, and overwrite the first previous asset metadata object using the first current asset metadata to obtain a second previous asset metadata object for the service.

In general, in one aspect, the invention relates to a client device that includes a computer processor and a client storage array storing an asset, a service executing on the computer processor and operatively connected to the asset, and a protection agent executing on the computer processor and maintaining at least a previous asset metadata object and a backup metadata object for the service, wherein the protection agent is programmed to: receive a backup operation request comprising a service name associated with the service, perform, in response to the backup operation request, a backup operation targeting the asset mapped to the service name to obtain backup operation metadata, make a determination that the backup operation does not represent a first backup operation directed to the service, identify, based on the determination, an asset metadata delta between a current asset metadata and the previous asset metadata object, update the backup metadata object using the backup operation metadata and the asset metadata delta, and overwrite the previous asset metadata object using the current asset metadata to obtain a new previous asset metadata object for the service.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for optimizing backup and backup discovery operations using change based metadata tracking (CBMT). Specifically, one or more embodiments of the invention entails eliminating the storage and subsequent transmission of redundant asset metadata information to a central coordination point during backup discovery operations, which may strain central coordination point resources, as well as client device resources. Accordingly, rather than re-sharing the same asset metadata information every time a backup discovery initiates, the client device tracks, maintains, and transmits only changes in asset metadata, thereby conserving resource utilization.

Figure 1A:
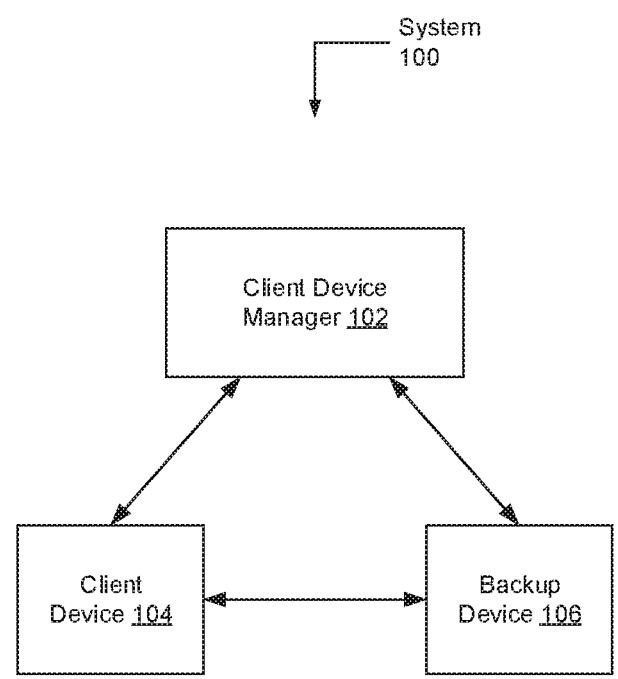
FIG. 1A shows a system in accordance with one or more embodiments of the invention.

FIG. 1A shows a system in accordance with one or more embodiments of the invention. The system (100) may include a client device manager (102), a client device (104), and a backup device (106). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device manager (102) may represent a monitoring and management system, which may at least be responsible for centralizing client device (104) administration and/or operations. To that extent, the client device manager (102) may include functionality to: issue backup operation requests to the client device (104), where each issued backup operation request may target one or more assets belonging to a service (described below) executing on the client device (104); issue backup discovery requests to the client device (104) directed to obtaining backup operation metadata descriptive of backup operations previously instigated on the client device (104); and receive, in response to the issued backup discovery requests, backup discovery replies from the client device (104), which may return the aforementioned sought backup operation metadata. One of ordinary skill will appreciate that the client device manager (102) may perform other functionalities without departing from the scope of the invention.

In one embodiment of the invention, the client device manager (102) may be implemented using one or more servers (not shown). Each server may reflect a physical server that may reside in a datacenter, or a virtual server that may reside in a cloud computing environment. Additionally or alternatively, the client device manager (102) may be implemented using one or more computing systems similar to the exemplary computing system shown in FIG. 3.

In one embodiment of the invention, the client device (104) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, the client device (104) may include and allocate various resources (e.g., computer processors, memory, storage, virtualization, network bandwidth, etc.), as needed, to the computer program(s) and the task(s) (process(es)) instantiated thereby. One of ordinary skill will appreciate that the client device (104) may perform other functionalities without departing from the scope of the invention. Examples of the client device (104) may include, but are not limited to, a desktop computer, a laptop computer, a workstation computer, a server, a mainframe, or any other computing system similar to the exemplary computing system shown in FIG. 3. Moreover, the client device (104) is described in further detail below with respect to FIG. 1B.

In one embodiment of the invention, the backup device (106) may represent a data backup, archiving, and/or disaster recovery storage system. To that extent, the backup device (106) may at least be designed and configured to: receive and store asset copies, respective to one or more services (described below) (see e.g., FIG. 1B), from the client device (104) during asset backup operations; and retrieve and restore asset copies, respective to the aforementioned service(s), onto the client device (104) during asset recovery operations. One of ordinary skill will appreciate that the backup device (106) may perform other functionalities without departing from the scope of the invention.

In one embodiment of the invention, the backup device (106) may be implemented using one or more servers (not shown). Each server may reflect a physical server, which may reside in a datacenter, or a virtual server, which may reside in a cloud computing environment. Additionally or alternatively, the backup device (106) may be implemented using one or more computing systems similar to the exemplary computing system shown in FIG. 3.

In one embodiment of the invention, each above-mentioned server (or computing system) may include a collection of one or more physical storage devices (not shown) on which various forms of data—e.g., the above-mentioned asset copies respective to one or more services executing on the client device (104)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset of the physical storage device(s) on each server (or computing system) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 1A shows a configuration of components, other system (100) configurations may be used without departing from the scope of the invention. For example, the system (100) may further include one or more additional client devices (not shown) and/or one or more additional backup devices (not shown).

Figure 1B:
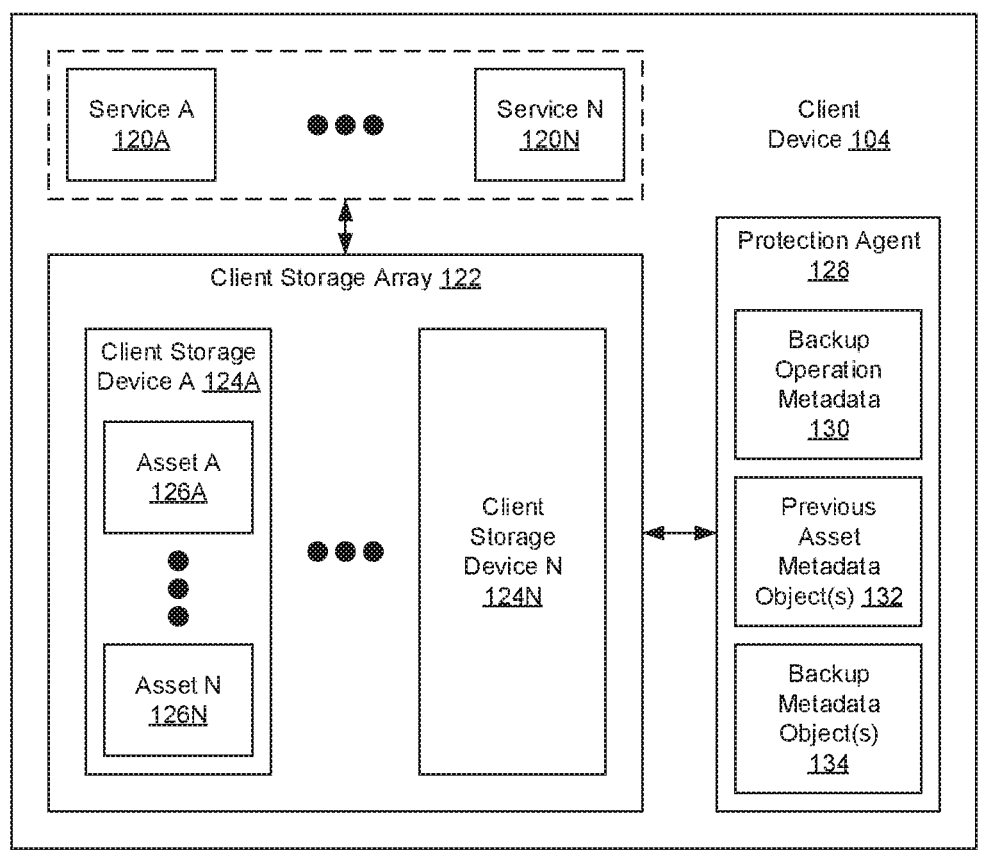
FIG. 1B shows a client device in accordance with one or more embodiments of the invention.

FIG. 1B shows a client device in accordance with one or more embodiments of the invention. The client device (104) may include one or more services (120A-120N), a client storage array (122), and a protection agent (128). Each of these client device (104) subcomponents is described below.

In one embodiment of the invention, a service (120A-120N) may represent a database management system instance (e.g., a computer program), which may execute on the underlying hardware of the client device (104) as an operating system service. Each service (120A-120N) may manage one or more databases (also referred to as assets), which may maintain both system-pertinent and user-defined information and metadata. Further, any given service (120A-120N) may include functionality to enable client device (104) users to store and query data across the asset(s) respective to the given service (120A-120N). One of ordinary skill will appreciate that a service (120A-120N) may perform other functionalities without departing from the scope of the invention.

In one embodiment of the invention, the client storage array (122) may refer to physical data storage across which various forms of data—e.g., one or more assets (126A-126N) (described below)—may be maintained. The client storage array (122) may be implemented using one or more client storage devices (124A-124N). Each client storage device (124A-124N) may encompass non-transitory computer readable storage media on which data may be stored in whole or in part, and temporarily or permanently. Further, each client storage device (124A-124N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (142) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (126A-126N) may represent a database, or a logical container to and from which related data may be stored and retrieved, respectively. An asset (126A-126N) may occupy a portion of a client storage device (124A-124N) or, alternatively, may span across multiple client storage devices (124A-124N), of the client storage array (122). Furthermore, an asset (126A-126N) may refer to a composite of various database objects (not shown) including, but not limited to, one or more data files, one or more control files, and one or more redo log files.

In one embodiment of the invention, a data file may refer to a database object for storing database data. Database data may encompass computer readable content (e.g., images, text, video, audio, machine code, any other form of computer readable content, or a combination thereof). A control file may refer to a database object for storing asset (126A-126N) metadata (also referred to as database metadata). Database metadata may encompass information descriptive of the database (or asset (126A-126N)) status and structure. By way of examples, database metadata may include, but are not limited to, a database name assigned to the asset (126A-126N), the name(s) and storage location(s) of one or more data files and redo log files associated with the asset (126A-126N), a creation timestamp encoding the date and/or time marking the creation of the asset (126A-126N), a log sequence number associated with a current redo log file, etc. Moreover, a redo log file may refer to a database object for storing a history of changes made to the database data. A redo log file may include one or more redo entries (or redo records), which may include a set of change vectors. Each change vector subsequently describes or represents a modification made to a single asset (126A-126N) data block. Furthermore, a redo log file may serve to recover the asset (126A-126N) should a failover occur, or to apply recent changes to a recovered asset (126A-126N) which may have transpired during the database recovery process.

In one embodiment of the invention, the protection agent (128) may refer to a computer program that may execute on the underlying hardware of the client device (104). Specifically, the protection agent (128) may be designed and configured to facilitate asset backup and backup discovery operations. To that extent, the protection agent (128) may include functionality to perform the various steps outlined below with respect to FIGS. 2A and 2B, which may be directed to optimizing the aforementioned backup and backup discovery operations, targeting one or more assets (126A-126N), using change based metadata tracking (CBMT). One of ordinary skill will appreciate that the protection agent (128) may perform other functionalities without departing from the scope of the invention.

In one embodiment of the invention, in facilitating backup and backup discovery operations, the protection agent (128) may maintain and/or access backup operation metadata (130), which may be stored in memory (not shown) or in the client storage array (122). The backup operation metadata (130) may refer to information descriptive of a backup operation targeting one or more assets (126A-126N) of a given service (120A-120N), which is currently being performed or had just recently completed on the client device (104). By way of examples, backup operation metadata (130) may include, but is not limited to, a status label indicating a current status of the backup operation (e.g., in-progress, successfully completed, failed, etc.), a failure reason description detailing the reason(s) for the incompletion of the backup operation (if applicable), target backup device (106) information (e.g., backup device hostname, backup device credentials, etc.) associated with the backup operation, a target device profile (e.g., a local storage, a cloud storage, object storage, etc.), and a backup operation type (e.g., a backup, a replication, etc).

In one embodiment of the invention, in facilitating backup and backup discovery operations, the protection agent (128) may further maintain and/or access one or more previous asset metadata objects (132), which may be stored in memory (not shown) or in the client storage array (122). A cardinality (i.e., number) of previous asset metadata objects (132) may match a cardinality of services (120A-120N) executing on the client device (104); therefore, a previous asset metadata object (132) may be maintained for each service (120A-120N). Further, any given previous asset metadata object (132) may refer to a data object (e.g., a data file, a data structure, or a composite data variable) used for storing asset metadata, descriptive of one or more assets belonging to a given service (120A-120N), which may have been the target(s) of a previously performed asset backup operation (i.e., a backup operation carried out just prior to a current backup operation being executed or had just recently been completed). Examples of asset metadata (for a given asset) may include, but are not limited to, a name assigned to uniquely identify the given asset, a status label indicating a current status (e.g., online, offline, etc.) of the given asset, an input-output (TO) mode (e.g., read-only or read-write) associated with the given asset, a data size of the asset, a data type (e.g., clustered asset, a stand-alone asset), and/or an asset storage layout (e.g., stored on a local disk, in an external storage array, etc.).

In one embodiment of the invention, in facilitating backup and backup discovery operations, the protection agent (128) may further maintain and/or access one or more backup metadata objects (134), which may be stored in memory (not shown) or in the client storage array (122). A cardinality (i.e., number) of backup metadata objects (134) may match a cardinality of services (120A-120N) executing on the client device (104); therefore, a backup metadata object (134) may be maintained for each service (120A-120N). Further, any given backup metadata object (134) may refer to a data object (e.g., a data file, a data structure, or a composite data variable) used for storing, between backup discovery operations: (a) in a first partition—asset metadata and/or asset metadata deltas (i.e., changes or differences) descriptive of one or more assets (126A-126N) belonging to a given service (120A-120N); and (b) in a second partition—backup operation metadata descriptive of one or more backup operations that may have targeted the asset(s) (126A-126N) belonging to the given service (120A-120N).

While FIG. 1B shows a configuration of components, other client device (104) configurations may be used without departing from the scope of the invention.

Figure 2A:
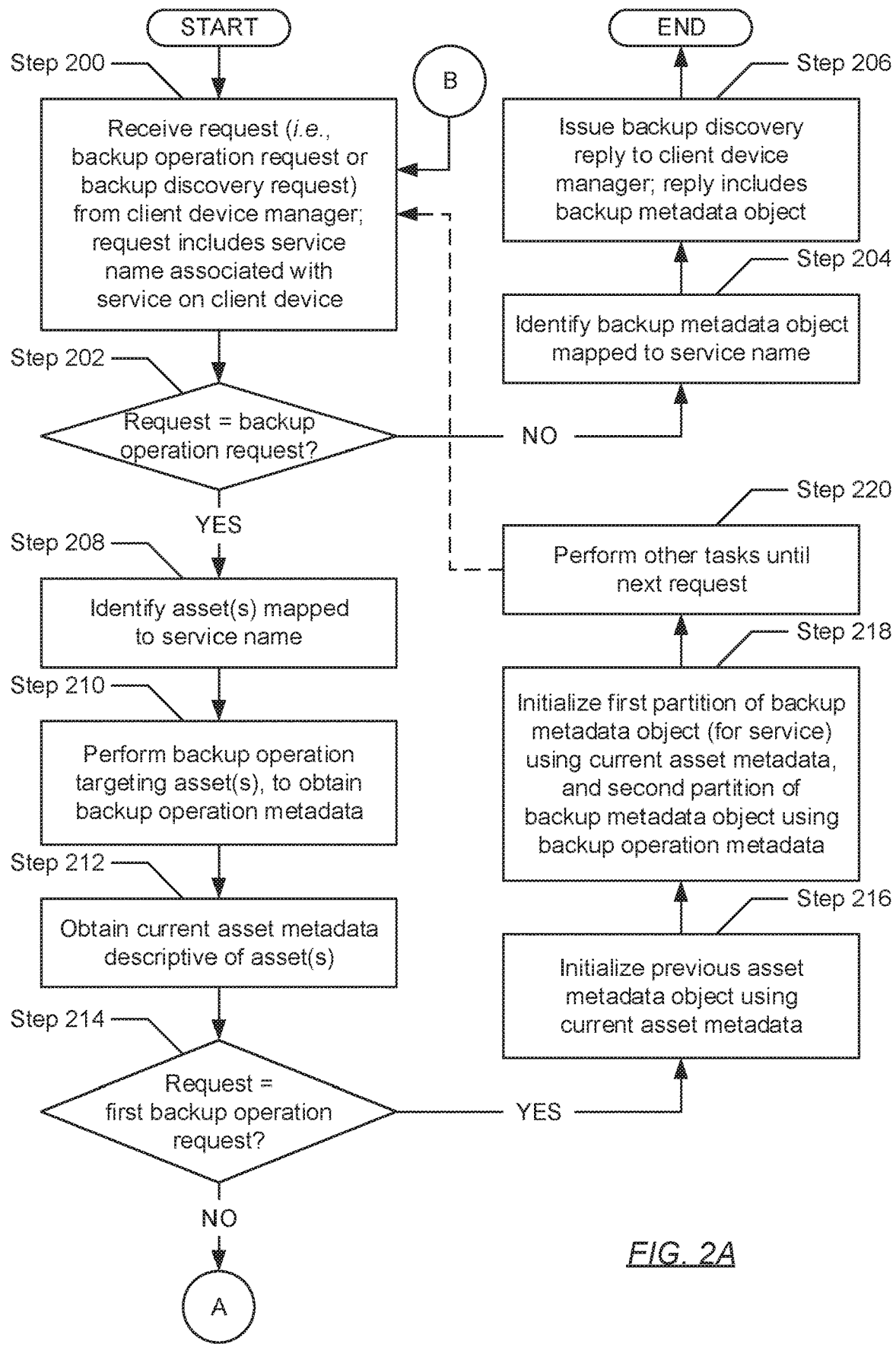
FIGS. 2A and 2B show flowcharts describing a method for optimizing backup and backup discovery operations using change based metadata tracking in accordance with one or more embodiments of the invention.
Figure 2B:
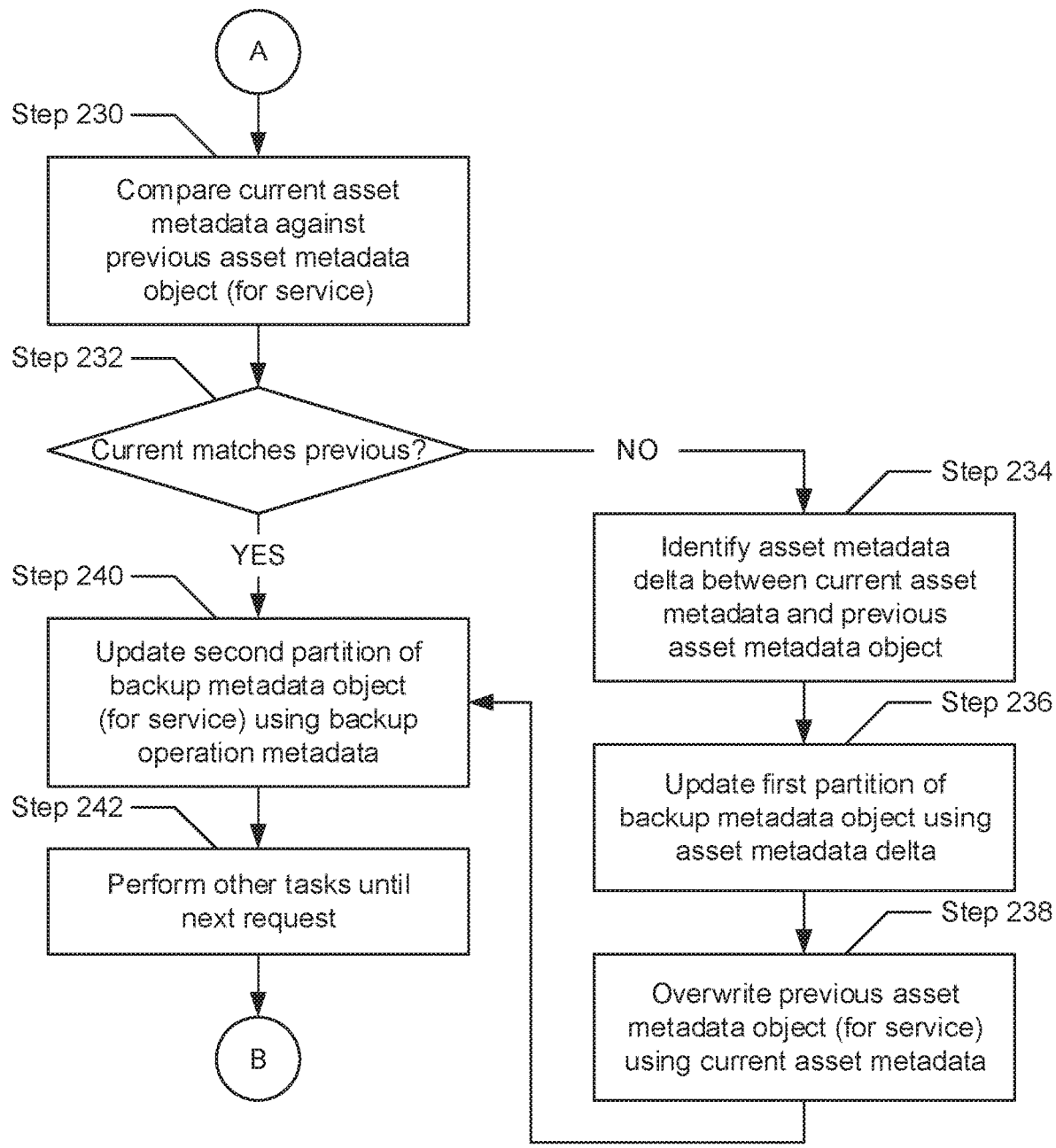

FIGS. 2A and 2B show flowcharts describing a method for optimizing backup and backup discovery operations using change based metadata tracking in accordance with one or more embodiments of the invention. The various steps outlined below may be performed by the protection agent on a client device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a request is received from the client device manager (described above) (see e.g., FIG. 1A). In one embodiment of the invention, the request may take form as a backup operation request, which may be directed to carrying out a backup operation on the client device targeting one or more assets belonging to a service executing thereon. In another embodiment of the invention, the request may alternatively take form as a backup discovery request, which may be directed to carrying out a backup discovery operation, to ascertain the state of one or more earlier carried out backup operations, on the client device. Furthermore, for either aforementioned embodiment, the request may include a service name assigned to uniquely identify a given service on the client device.

In Step 202, a determination is made as to whether the request (received in Step 200) is a backup operation request. In one embodiment of the invention, if it is determined that the request is a backup operation request, then the process proceeds to Step 208. On the other hand, in another embodiment of the invention, if it is alternatively determined that the request is a backup discovery request, then the process alternatively proceeds to Step 204.

In Step 204, upon determining (in Step 202) that the request (received in Step 200) is a backup discovery request, a backup metadata object (described above) (see e.g., FIG. 1B) is identified. In one embodiment of the invention, the backup metadata object may be one of many backup metadata objects maintained on the client device. Particularly, a backup metadata object may be maintained for each service that may be executing on the client device. Accordingly, the appropriate backup metadata object may be identified using the service name (enclosed with the request received in Step 200).

In Step 206, a backup discovery reply is issued. In one embodiment of the invention, the backup discovery reply may represent a response to the request (received in Step 200) and, accordingly, may be directed to the client device manager. Furthermore, the backup discovery reply may include the backup metadata object (identified in Step 204), which had been mapped to the service name enclosed with the request.

In Step 208, upon alternatively determining (in Step 202) that the request (received in Step 200) is a backup operation request, one or more assets, maintained on the client device, is/are identified. In one embodiment of the invention, the asset(s) may belong to a given service executing on the client device and, accordingly, may be identified using the service name associated with the given service, which had been enclosed with the request.

In Step 210, a backup operation is performed. In one embodiment of the invention, the backup operation may target the asset(s) (identified in Step 208). Further, execution of the backup operation may entail replicating any granularity of the asset(s) to obtain one or more asset copies, which may subsequently be steered towards a backup device (see e.g., FIG. 1A) for storage. Moreover, during or following the execution of the backup operation, backup operation metadata (described above) (see e.g., FIG. 1B), descriptive of the backup operation, may be produced.

In Step 212, a current asset metadata is obtained. In one embodiment of the invention, the current asset metadata may represent information descriptive of the collective current state and/or current configuration of the asset(s) (identified in Step 208). Thereafter, in Step 214, a determination is made as to whether the request (received in Step 200) represents a first backup operation request received for the given service, which had triggered a first backup operation (performed in Step 210) targeting the asset(s) of the given service. In one embodiment of the invention, if it is determined that the request is a first backup operation request directed to the given service, then the process proceeds to Step 216. On the other hand, in another embodiment of the invention, if it is alternatively determined that the request is a second, third, or so forth backup operation request directed to the given service, then the process alternatively proceeds to Step 230 (see e.g., FIG. 2B).

In Step 216, upon determining (in Step 214) that the request (received in Step 200) is representative of a first backup operation request directed to the given service, a previous asset metadata object (described above) (see e.g., FIG. 1B) is initialized. In one embodiment of the invention, the previous asset metadata object may be one of many previous asset metadata objects maintained on the client device. Particularly, a previous asset metadata object may be maintained for each service that may be executing on the client device. Accordingly, a previous asset metadata object, respective to the given service, may be created and initialized using the current asset metadata (obtained in Step 212).

In Step 218, a backup metadata object (described above) (see e.g., FIG. 1B) is initialized. In one embodiment of the invention, the backup metadata object may be one of many backup metadata objects maintained on the client device. Particularly, a backup metadata object may be maintained for each service that may be executing on the client device. Accordingly, a backup metadata object, respective to the given service, may be created and initialized. Specifically, a first partition of the backup metadata object may be initialized using the current asset metadata (obtained in Step 212), whereas a second partition of the backup metadata object may be initialized using the backup operation metadata (obtained in Step 210). Thereafter, in Step 220, other tasks (for which the protection agent on the client device may be responsible) are performed until a next request—i.e., backup operation request or backup discovery request—is received.

Turning to FIG. 2B, in Step 230, upon alternatively determining (in Step 214) that the request (received in Step 200) is representative of a second, third, or so forth backup operation request directed to the given service, the current asset metadata (obtained in Step 212) is compared against a previous asset metadata object (described above) (see e.g., FIG. 1B) maintained for and associated with the given service. In one embodiment of the invention, the previous asset metadata object may store asset metadata, descriptive of one or more assets belonging to the given service, which may have been obtained following a previously executed backup operation targeting the asset(s).

In Step 232, a determination is made, based on the comparison (performed in Step 230), as to whether the current asset metadata (obtained in Step 212) matches asset metadata stored in the above-mentioned previous asset metadata object. In one embodiment of the invention, if it is determined that the current asset metadata matches asset metadata stored in the previous asset metadata object, then the process proceeds to Step 240. On the other hand, in another embodiment of the invention, if it is alternatively determined that the current asset metadata mismatches asset metadata stored in the previous asset metadata object, then the process alternatively proceeds to Step 234.

In Step 234, upon determining (in Step 232) that the current asset metadata (obtained in Step 212) mismatches asset metadata stored in the above-mentioned previous asset metadata object, an asset metadata delta is identified. In one embodiment of the invention, the asset metadata delta may represent differences or changes in asset metadata disclosed between the current asset metadata and the asset metadata stored in the previous asset metadata object.

In Step 236, a backup metadata object, respective to the given service, is updated. Specifically, in one embodiment of the invention, a first partition of the backup metadata object may be updated to append the asset metadata delta (identified in Step 234). Accordingly, the backup metadata object, for a given service, may at least in part serve to prevent the return of redundant backup discovery pertinent information (e.g., asset metadata) to the client device manager by only storing selective information—i.e., any differences or changes amongst successively obtained asset metadata following successively executed backup operations, respectively.

In Step 238, the previous asset metadata object (mentioned in Step 230), respective to the given service, is overwritten. Specifically, in one embodiment of the invention, the existing asset metadata stored in the previous asset metadata object may be replaced with the current asset metadata (obtained in Step 212). Accordingly, the previous asset metadata object stores asset metadata that may be compared against a new current asset metadata, which may be obtained following a future executed backup operation targeting asset(s) of the given service.

In Step 240, after overwriting the previous asset metadata object (in Step 238) or, alternatively, upon determining (in Step 232) that the current asset metadata (obtained in Step 212) matches asset metadata stored in the previous asset metadata object, a backup metadata object, respective to the given service, is updated. Specifically, in one embodiment of the invention, a second partition of the backup metadata object may be updated to append the backup operation metadata (obtained in Step 210). Accordingly, the backup metadata object, for a given service, may at least in part serve as an aggregation point for backup operation metadata describing multiple backup operations, which may be returned to the client device manager during a future backup discovery operation. Thereafter, in Step 242, other tasks (for which the protection agent on the client device may be responsible) are performed until a next request—i.e., backup operation request or backup discovery request—is received.

Figure 3:
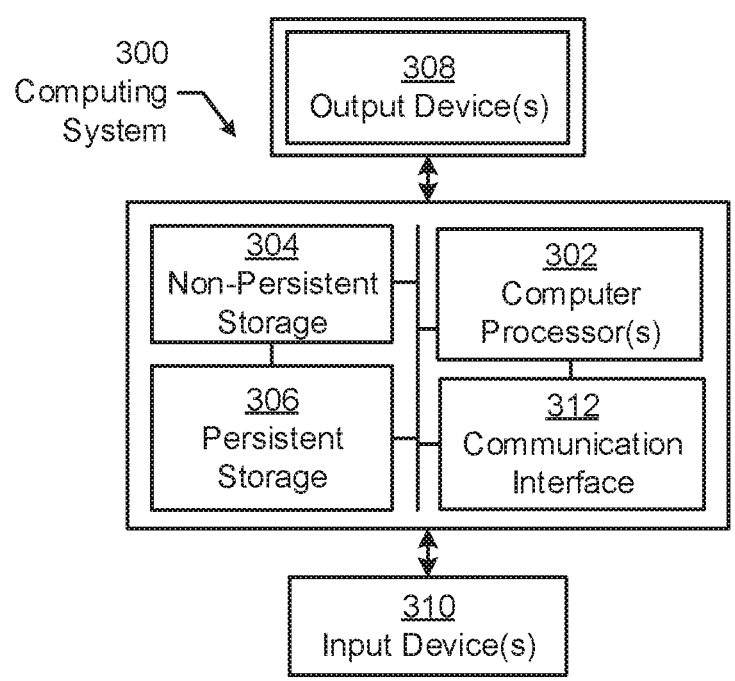
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for asset backup optimization, comprising:
receiving, from a client device manager, a first backup operation request comprising a service name associated with a service;
performing, in response to the first backup operation request, a backup operation targeting a first asset mapped to the service name to obtain backup operation metadata;
making a first determination that the backup operation does not represent a first backup operation directed to the service;
identifying, based on the first determination, an asset metadata delta between a first current asset metadata and a first previous asset metadata object associated with the service;
updating a first backup metadata object associated with the service using the backup operation metadata and the asset metadata delta to obtain a second backup metadata object for the service; and
overwriting the first previous asset metadata object using the first current asset metadata to obtain a second previous asset metadata object for the service.

2. The method of claim 1, wherein the backup operation further targets a second asset mapped to the service name to obtain the backup operation metadata.

3. The method of claim 1, wherein the first current asset metadata comprises state and configuration information describing the first asset at an outset of the backup operation.

4. The method of claim 1, wherein the first previous asset metadata object comprises state and configuration information describing the first asset at an outset of a previously performed backup operation directed to the service.

5. The method of claim 1, further comprising:
prior to identifying the asset metadata delta:
making a second determination that the first current asset metadata mismatches the first previous asset metadata object.

6. The method of claim 1, further comprising:
prior to receiving the first backup operation request:
receiving, from the client device manager, a second backup operation request comprising the service name associated with the service;
performing, in response to the second backup operation request, another backup operation targeting the first asset mapped to the service name to obtain other backup operation metadata;
making a second determination that the other backup operation represents the first backup operation directed to the service; and
initializing, based on the second determination, the first previous asset metadata object using a second current asset metadata, and the first backup metadata object using the second current asset metadata and the other backup operation metadata.

7. The method of claim 6, wherein the second current asset metadata comprises state and configuration information describing the first asset at an outset of the other backup operation.

8. The method of claim 6, wherein the second backup metadata object comprises the second current asset metadata and the asset metadata delta.

9. The method of claim 8, wherein the second backup metadata object further comprises the other backup operation metadata and the backup operation metadata.

10. The method of claim 1, further comprising:
receiving, from the client device manager, a backup discovery request comprising the service name associated with the service;
identifying, by mapping the service name to, the second backup metadata object; and
issuing, in response to the backup discovery request and to the client device manager, a backup discovery reply comprising the second backup metadata object.

11. The method of claim 1, further comprising:
receiving, from the client device manager, a second backup operation request comprising the service name associated with the service;
performing, in response to the second backup operation request, another backup operation targeting the first asset mapped to the service name to obtain other backup operation metadata;
making a second determination that the second backup operation does not represent the first backup operation directed to the service; and
updating the second backup metadata object associated with the service using the other backup operation metadata to obtain a third backup metadata object for the service.

12. The method of claim 11, further comprising:
prior to updating the second backup metadata object:
making a third determination that a second current asset metadata matches the second previous asset metadata object for the service.

13. The method of claim 12, wherein the second current asset metadata comprises state and configuration information describing the first asset at an outset of the second backup operation.

14. A non-transitory computer readable medium (CRM) comprising computer readable program code, which when executed by a computer processor, enables the computer processor to:
receive, from a client device manager, a first backup operation request comprising a service name associated with a service;
perform, in response to the first backup operation request, a backup operation targeting a first asset mapped to the service name to obtain backup operation metadata;
make a first determination that the backup operation does not represent a first backup operation directed to the service;
identify, based on the first determination, an asset metadata delta between a first current asset metadata and a first previous asset metadata object associated with the service;
update a first backup metadata object associated with the service using the backup operation metadata and the asset metadata delta to obtain a second backup metadata object for the service; and
overwrite the first previous asset metadata object using the first current asset metadata to obtain a second previous asset metadata object for the service.

15. The non-transitory CRM of claim 14, wherein the first current asset metadata comprises state and configuration information describing the first asset at an outset of the backup operation.

16. The non-transitory CRM of claim 14, wherein the first previous asset metadata object comprises state and configuration information describing the first asset at an outset of a previously performed backup operation directed to the service.

17. The non-transitory CRM of claim 14, comprising computer readable program code, which when executed by the computer processor, further enables the computer processor to:
   prior to receiving the first backup operation request:
      receive, from the client device manager, a second backup operation request comprising the service name associated with the service;
      perform, in response to the second backup operation request, another backup operation targeting the first asset mapped to the service name to obtain other backup operation metadata;
      make a second determination that the other backup operation represents the first backup operation directed to the service; and
      initialize, based on the second determination, the first previous asset metadata object using a second current asset metadata, and the first backup metadata object using the second current asset metadata and the other backup operation metadata.

18. The non-transitory CRM of claim 17, wherein the second backup metadata object comprises the second current asset metadata and the asset metadata delta.

19. The non-transitory CRM of claim 17, wherein the second backup metadata object further comprises the other backup operation metadata and the backup operation metadata.

20. A client device, comprising:
   a computer processor and a client storage array storing an asset;
   a service executing on the computer processor and operatively connected to the asset; and
   a protection agent executing on the computer processor and maintaining at least a previous asset metadata object and a backup metadata object for the service,
   wherein the protection agent is programmed to:
      receive a backup operation request comprising a service name associated with the service;
      perform, in response to the backup operation request, a backup operation targeting the asset mapped to the service name to obtain backup operation metadata;
      make a determination that the backup operation does not represent a first backup operation directed to the service;
      identify, based on the determination, an asset metadata delta between a current asset metadata and the previous asset metadata object;
      update the backup metadata object using the backup operation metadata and the asset metadata delta; and
      overwrite the previous asset metadata object using the current asset metadata to obtain a new previous asset metadata object for the service.

* * * * *